3,140,546
SKIN FOLD CALIPER
Reginald C. Bartlett, Stratford, Ontario, Canada, assignor to Lloyd Cleveland Bartlett, Winnipeg, Manitoba, Canada
Filed July 5, 1962, Ser. No. 207,620
3 Claims. (Cl. 33—148)

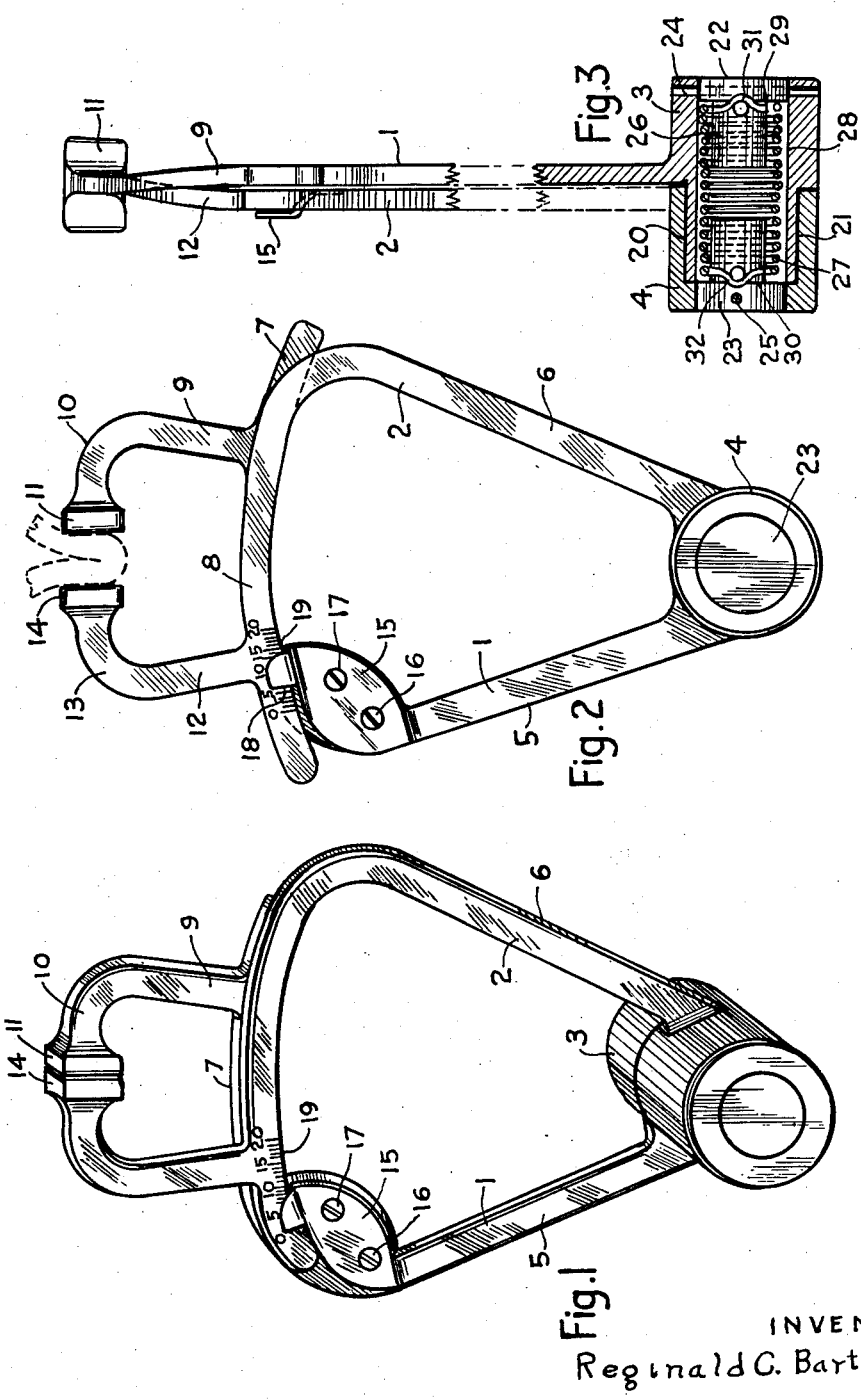

This invention relates to a skin fold caliper, particularly the type of caliper having two spring controlled pivoted measuring arms.

At present there are calipers having pivoted arms with jaws on the ends of the arms for measuring the dimensions of various objects and which employ a spring attached to the hubs of the caliper arms having a spring mounted therein for opening the jaws, while in this invention the tension of the spring in the hubs of the caliper arms holds the jaws closed.

It is essential for accurate measurements of skin folds or similar objects that the caliper arms be mounted to maintain the jaws of the caliper arms in closed position to grip an object being measured in secure position.

The main object of this invention is to provide a skin fold caliper that is economically manufactured, accurate in operation, durable and reliable.

Another object is to provide a skin fold caliper which is manually operated in one hand and is extremely sensitive to pressure on the caliper arms for measuring skin folds or similar objects.

These objects are secured by providing a skin fold caliper consisting of two caliper arms having measuring jaws at one end and hubs at the other end. The hub of one caliper arm fits over part of the other caliper arm hub so that one caliper arm may rotate relatively to the other caliper arm. Spring retaining plugs are mountned interiorly of the outer ends of the caliper arm hubs. Pins are passed through the respective caliper arm hubs and their interiorly fitted spring mounted plugs to maintain them in secure position. Pins are mounted in the spring retaining plugs for hooking the ends of a tension coil spring which holds the caliper arms together. On the top part of one caliper arm is mounted a gauge bracket having a measuring edge for co-operation with a graduated surface on an upper part of the other caliper arm.

The invention consists in the novel arrangements, construction and combination of parts hereinafter described and shown in the drawings.

FIGURE 1 is a front elevation view of the skin fold caliper in closed position;

FIGURE 2 is a front elevation view of the skin fold in open operative position;

FIGURE 3 is a side elevational view of the skin fold caliper partially in cross section as shown in FIGURE 2.

Referring to the drawings particularly FIGURES 1 and 2, the skin fold caliper arms 1 and 2 are mounted on hubs 3 and 4 respectively. The caliper arms 1 and 2 consist of the upwardly and outwardly extending parts 5 and 6, and the inwardly extending overlapping approximately horizontal parts 7 and 8 respectively. A vertical part 9 extends upwards from the part 7 and then bends approximately horizontally inwardly to form a part 10 having a flat faced jaw 11. A vertical part 12 extends upwards from the part 8 of the caliper arm 2 and then bends approximately horizontally inwardly to form a part 13 having a flat faced jaw 14. As shown in FIGURE 3 two parts 9 and 12 of the caliper arms 1 and 2 respectively are curved inwardly so that the flat faces of the jaws 11 and 14 are directly opposite to one another.

As shown in FIGURES 1 and 2 a gauge bracket 15 is mounted on the caliper arm 1 at about the junction of the parts 5 and 7 by screws 16 and 17 or other suitable means. A measuring edge 18 is shown on the upper part of the gauge bracket 15. The part 8 of the caliper arm 2 has graduations 19 marked or etched thereon for cooperation with the measuring edge 18 of the gauge bracket 15.

As shown more particularly in FIGURE 3, the hub 3 of the caliper arm 1 is reduced in diameter at 20, and the hub 4 of the caliper arm is interiorly increased in diameter at 21 to fit over the part 20 of the caliper hub 3. Spring retaining plugs 22 and 23 are mounted centrally of the caliper arm hubs 3 and 4 respectively. The spring retaining plugs 22 and 23 are fastened to the caliper arm hubs by pins 24 and 25 respectively passing transversely and centrally of the hubs 3, 4, and plugs 22 and 23, to prevent rotation of the caliper arm hub 3 relative to the spring retaining hub 22 and the caliper arm plug 4 relative to the spring retaining plug 23. The spring retaining plugs 22 and 23 are reduced in diameter to form inwardly extending parts 26 and 27 respectively as shown in FIGURE 3. A coiled spring 28 is fitted over the inwardly extending parts 26 and 27. The ends 29 and 30 of the coil spring 28 are hooked over pins 31 and 32 mounted in the inwardly extending parts 26 and 27 respectively to retain the spring 28 in desired position and with the desired tension to maintain the caliper arm jaws 11 and 14 in closed position. The coil spring 28 is given a predetermined tension before placing the spring retaining plugs 22 and 23 in position and fastening them to the caliper arm hubs 3 and 4 with the pins 24 and 25.

As shown in FIGURE 1, when the caliper is not in operative position the edge 18 of the gauge bracket 15 indicates zero on the graduations 19. In operation the caliper is squeezed by pressing the parts 5 and 6 together to open the jaws 11 and 14 to permit the skin fold or other object to be placed between the jaws. The pressure on parts 5 and 6 is then released and the edge of the gauge bracket 15 will then indicate on the graduations 19 of the part 8 the desired measurement.

While the invention has been fully described with particular reference to the specific embodiments it is understood it is to be construed broadly and limited only by the scope of the claims.

The embodiments of the invention in which an exclusive property or privilege is claimed are defined as follows:

I claim:

1. A skin fold caliper comprising a pair of tubular hubs, one of said hubs having a reduced end rotatably fitted in one end of the other hub, arms radiating from said hubs in angularly disposed relation having their upper ends bent to form laterally extending parts disposed in overlapping relation, the laterally extending parts adjacent their free end having upstanding parts terminating in inwardly extending jaws disposed in opposed relation, a plug fixedly mounted in the outer end of each of said hubs having a reduced inner end, and a coil spring fitted over the reduced ends of said plugs and secured thereto with the spring under tension whereby the hubs are held together and the jaws of said arms are held in closed position.

2. A skin fold caliper as described in claim 1 wherein the reduced ends of said plugs are provided with pins in their sides to receive the ends of said spring to expand and hold the spring under tension.

3. A skin fold caliper as described in claim 1 including a measuring bracket attached to one of said arms having a measuring edge for co-action with graduations formed along the laterally extending part of the other arm.

References Cited in the file of this patent

UNITED STATES PATENTS

| | | |
|---|---|---|
| 611,391 | Pike | Sept. 27, 1898 |
| 1,532,297 | Baush et al. | Apr. 7, 1925 |
| 1,879,941 | McCable | Sept. 27, 1932 |
| 3,008,239 | Lange | Nov. 14, 1961 |